US008320671B1

(12) United States Patent
Zoghlami

(10) Patent No.: US 8,320,671 B1
(45) Date of Patent: Nov. 27, 2012

(54) METHOD FOR RANKING IMAGE SIMILARITY AND SYSTEM FOR USE THEREWITH

(76) Inventor: Imad Zoghlami, Mississauga (CA)

(*) Notice: Subject to any disclaimer, the term of this patent is extended or adjusted under 35 U.S.C. 154(b) by 178 days.

(21) Appl. No.: 13/017,833

(22) Filed: Jan. 31, 2011

Related U.S. Application Data

(60) Provisional application No. 61/397,423, filed on Jun. 11, 2010.

(51) Int. Cl.
*G06K 9/00* (2006.01)
*G06K 9/68* (2006.01)
*G06K 9/34* (2006.01)

(52) U.S. Cl. .................................. 382/170; 382/218

(58) Field of Classification Search .............. 382/162, 382/164, 165, 167, 170, 173, 181, 190, 203, 382/218–220; 348/222.1, E03.012
See application file for complete search history.

(56) References Cited

U.S. PATENT DOCUMENTS

| | | | |
|---|---|---|---|
| 7,046,842 B2 * | 5/2006 | Lin et al. ........................ 382/165 |
| 7,181,064 B1 * | 2/2007 | Stevens et al. ................. 382/165 |
| 7,499,570 B2 | 3/2009 | Zoghlami et al. |
| 7,555,046 B2 | 6/2009 | Zoghlami et al. |
| 7,593,547 B2 | 9/2009 | Mittal et al. |
| 7,853,042 B2 | 12/2010 | Parameswaran et al. |
| 2007/0122031 A1 * | 5/2007 | Berriss et al. ................. 382/165 |
| 2008/0100473 A1 | 5/2008 | Gao et al. |
| 2009/0034793 A1 | 2/2009 | Dong et al. |
| 2009/0295934 A1 * | 12/2009 | Au et al. ..................... 348/222.1 |
| 2009/0310861 A1 * | 12/2009 | Lang et al. ................... 382/173 |
| 2010/0008540 A1 | 1/2010 | Shet et al. |
| 2010/0027892 A1 * | 2/2010 | Guan et al. ................... 382/203 |

* cited by examiner

*Primary Examiner* — Amir Alavi
(74) *Attorney, Agent, or Firm* — Head, Johnson & Kachigian, P.C.

(57) ABSTRACT

A system for use by a user and with a plurality of stored images. A retrieval facility for accessing said plurality of stored images; a display facility for displaying images from said plurality to said user; a response facility for permitting interaction between the user and the system; a selection facility for determining an image that is of interest to said user based on said interaction between said user and said system; and a comparison facility for carrying out a similarity analysis between the image determined to be of interest and each of at least a subset of said plurality of stored images, the similarity analysis involving a calculation based on one or more of a measurement of color similarity, texture similarity and shape similarity. The retrieval, display and response facility can be defined by a web browser.

21 Claims, 5 Drawing Sheets

FIG.1

METHOD FOR RANKING IMAGE SIMILARITY AND SYSTEM FOR USE THEREWITH

CROSS-REFERENCE

This application claims priority to U.S. Provisional Patent Application Ser. No. 61/397,423, filed Jun. 11, 2010, incorporated in its entirety herein by reference.

BACKGROUND OF THE INVENTION

1. Field of the Invention

The invention relates to the field e-commerce.

2. Prior Art

In the field of retailing, it is well-known to provide product suggestions to customers based on historical patterns. For example, it is known for book retailers to keep records of all books purchased by any given customer, and if a book retailer becomes aware that a party has an interest in a title, that retailer will suggest to that party other books purchased by earlier purchasers of the title. This methodology works well with products that are easily indexed by text.

SUMMARY OF THE INVENTION

Forming one aspect of the invention is a system for use by a user and with a plurality of stored images. The system comprises: a retrieval facility for accessing said plurality of stored images; a display facility for displaying images from said plurality to said user; a response facility for permitting interaction between the user and the system; a selection facility for determining an image that is of interest to said user based on said interaction between said user and said system; and a comparison facility for carrying out a similarity analysis between the image determined to be of interest and each of at least a subset of said plurality of stored images, the similarity analysis involving a calculation based on one or more of a measurement of color similarity, texture similarity and shape similarity.

According to another aspect of the invention, the retrieval, display and response facility can be defined by a web browser.

According to another aspect of the invention, the selection facility can determine the image of interest based on any one of: the selection by the user of an image made visible by the display facility; the result of a user-originated text search of a portion of the stored images that have been indexed for text searching; and a ranking calculation of images rendered viewable to the user by the display facility based on one or more of: the duration of image visibility; incidence of image visibility; and historical viewing patterns.

According to another aspect of the invention: the selection facility and comparison facility can be associated with a website; the comparison facility can carry out a similarity analysis between the image determined to be of interest and images associated with advertisements to select an advertisement; and the website can actuate the display facility to make the selected advertisement visible to the user.

A system for use by a user forms another aspect of the invention. The system comprises: a plurality of stored images; a retrieval facility for accessing the plurality of stored images; a display facility for displaying images from said plurality to said user; a response facility for permitting interaction between the user and the system; a selection facility for determining an image that is of interest to said user based on said interaction between said user and said system; and a comparison facility for carrying out a similarity analysis between the image determined to be of interest and each of at least a subset of said plurality of stored images, the similarity analysis involving a calculation based on one or more of a measurement of color similarity, texture similarity and shape similarity.

According to another aspect of the invention, the plurality of stored images forming part of the system can be associated with an online shopping portal.

According to another aspect of the invention, the selection facility can determine the image of interest in response to: the selection by the user of a vendible product in the catalogue of the portal; or the selection by the user of a portion of an image rendered visible to the user by the display facility.

According to another aspect of the invention: the display facility, in response to a determination of an image of interest, can carry out the similarity analysis between the image of interest and images associated with vendible products in the catalogue of the portal; and the online shopping portal can make visible to the user at least the image calculated to be most similar to the image of interest.

According to another aspect of the invention, the calculation can be based on at least two measurements selected from measurement of color similarity, measure of texture similarity and measurement of shape similarity.

According to another aspect of the invention, a tuning facility can be provided and adapted to permit the user to vary the relative weight given to at least one of the measurements in the calculation for the purpose of ranking.

According to another aspect of the invention, the tuning facility can be adapted to permit the user to balance texture similarity against color similarity in the weighting.

According to another aspect of the invention, the similarity analysis can involve a calculation based on at least a measurement of color similarity, the measurement of color similarity involving the steps of: for each of the image of interest and the images of the subset, creating a three-dimensional histogram, with each dimension of the histogram being associated with one of the colors red, green and blue and the histogram being populated with values correlated with the R-G-B color combinations associated with discrete elements of said each image; and intersecting the histograms.

According to another aspect of the invention, the pixels of the image can define the discrete elements of the image used for the purpose of the histogram and the histogram can be based on Gaussian-corrected, quantized R-G-B values.

According to another aspect of the invention, the similarity analysis can involve a calculation based on at least a measurement of texture similarity, the measurement of texture similarity involving the steps of providing a plurality of virtual filters; and for each of the image of interest and the images of the subset, applying each filter to a plurality of locations on said each image to generate an aggregate intensity associated with each filter.

According to another aspect of the invention: each filter can be a numeric array, the arrays having common dimensions; each location can have an associated numeric array of dimensions equal to the common dimension, the numerics being associated with brightness; and the application of the filter to a location can result in a value which is the product of the numeric array of the filter with the numeric array associated with the location, the value defining the aggregate intensity.

According to other aspects of the invention:

for each of the image of interest and the images of the subset, histograms can be created, one for each filter, the histogram being populated using the aggregate intensities that resulted from the application of said each filter to said each image; and for each filter, the histogram associated with the image of interest can be intersected with each of the histograms associated with the images of the subset, to produce values; and for each image of the subset, the values generated by the intersections can be aggregated.

According to another aspect of the invention, the filters can be DCT base filters and the histograms can be normalized to integrate to the value 1.0 before intersection.

According to another aspect of the invention, the similarity analysis can involve a calculation based on at least a measurement of shape similarity, the measurement of shape similarity involving the application of an edge detection tool to the image of interest and said each image under comparison to identify points coincident with visible contours.

According to another aspect of the invention, the measurement of shape similarity, as between the image of interest and each image under comparison, can involve an aggregation of values associated with each of at least a subset of the identified points of the image of interest, the values each being a function of the distance between the corresponding location of said each point on the image under comparison and the closest point coincident with a visible contour on the image under comparison.

According to another aspect of the invention, the measurement of shape similarity, as between the image of interest and each image under comparison, can involve an aggregation of values associated with each of at least a subset of the identified points of the image of interest, the values each being a function of: the distance between the corresponding location of said each point on the image under comparison and the closest point coincident with a visible contour on the image under comparison; the difference between the gradient of the contour at said each point and the gradient of the contour at said closest point; and the difference between the curvature of the contour at said each point and the curvature of the contour at said closest point.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF DESCRIPTION OF THE DRAWINGS

FIG. 1 is a screen shot of an online shopping portal functionalized according to an exemplary embodiment of the present invention;

DETAILED DESCRIPTION OF THE PREFERRED EMBODIMENT

Figure 2:
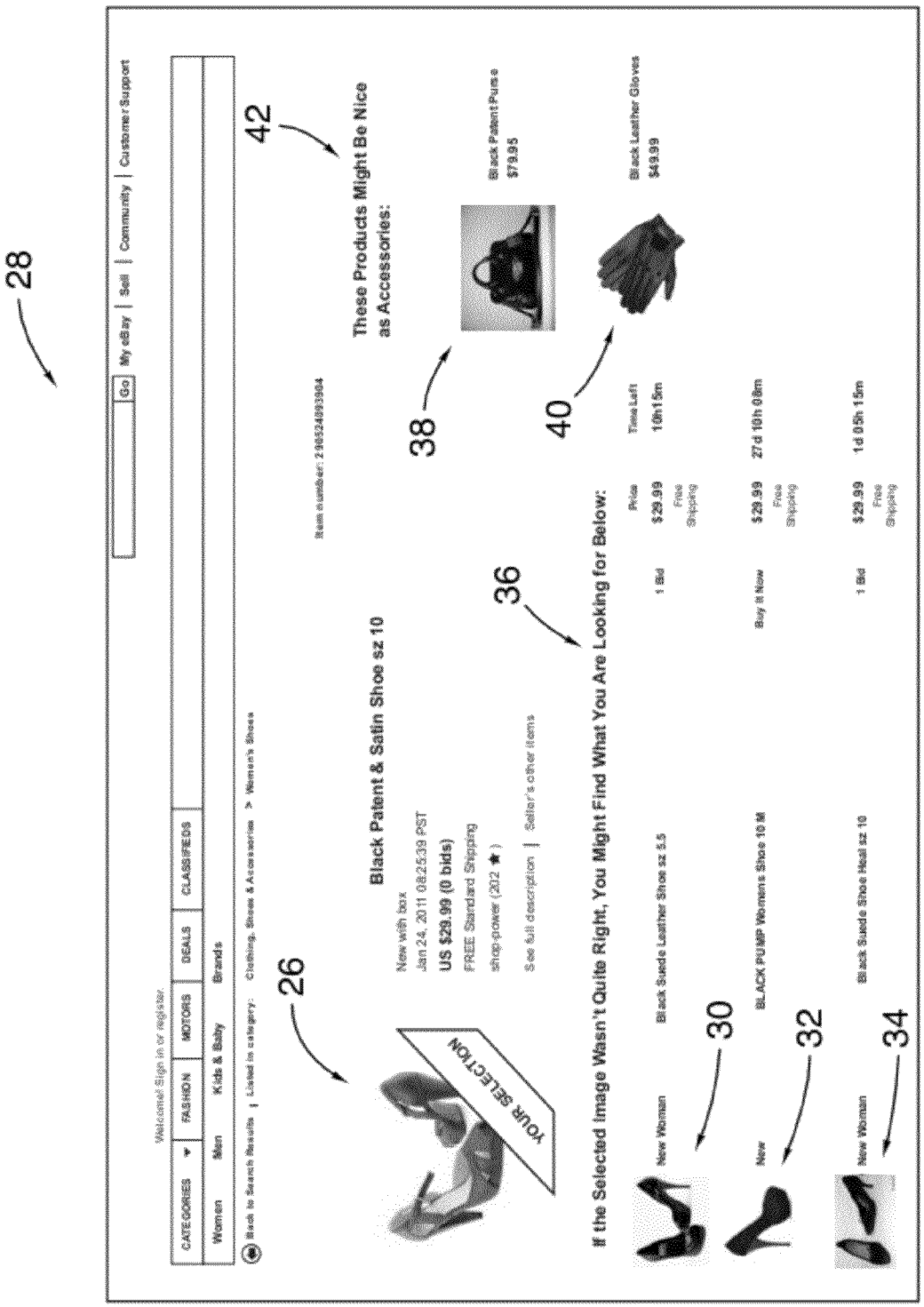
FIG. 2 is another screen shot of the portal of FIG. 1.

An exemplary embodiment of the present invention is described hereinafter and will be understood to comprise a selection facility and a comparison facility, embodied as part of a computer arrangement providing to the world an online shopping portal accessible by conventional Internet browsers. The portal, in combination with the browsers, defines a system.

The basic functionality of the online shopping portal, in combination with the Internet browsers, is generally conventional, i.e. the portal is for use with a plurality of stored images, each image being associated with a vendible product, and includes:

a retrieval facility for accessing the plurality of stored images;

a display facility for displaying images from said plurality to said user; and a response facility for permitting interaction between the user and the system.

Persons of ordinary skill in the art are familiar with the general functionality and construction of online shopping portals, and accordingly, further detail thereon is neither provided nor required.

Figure 1:
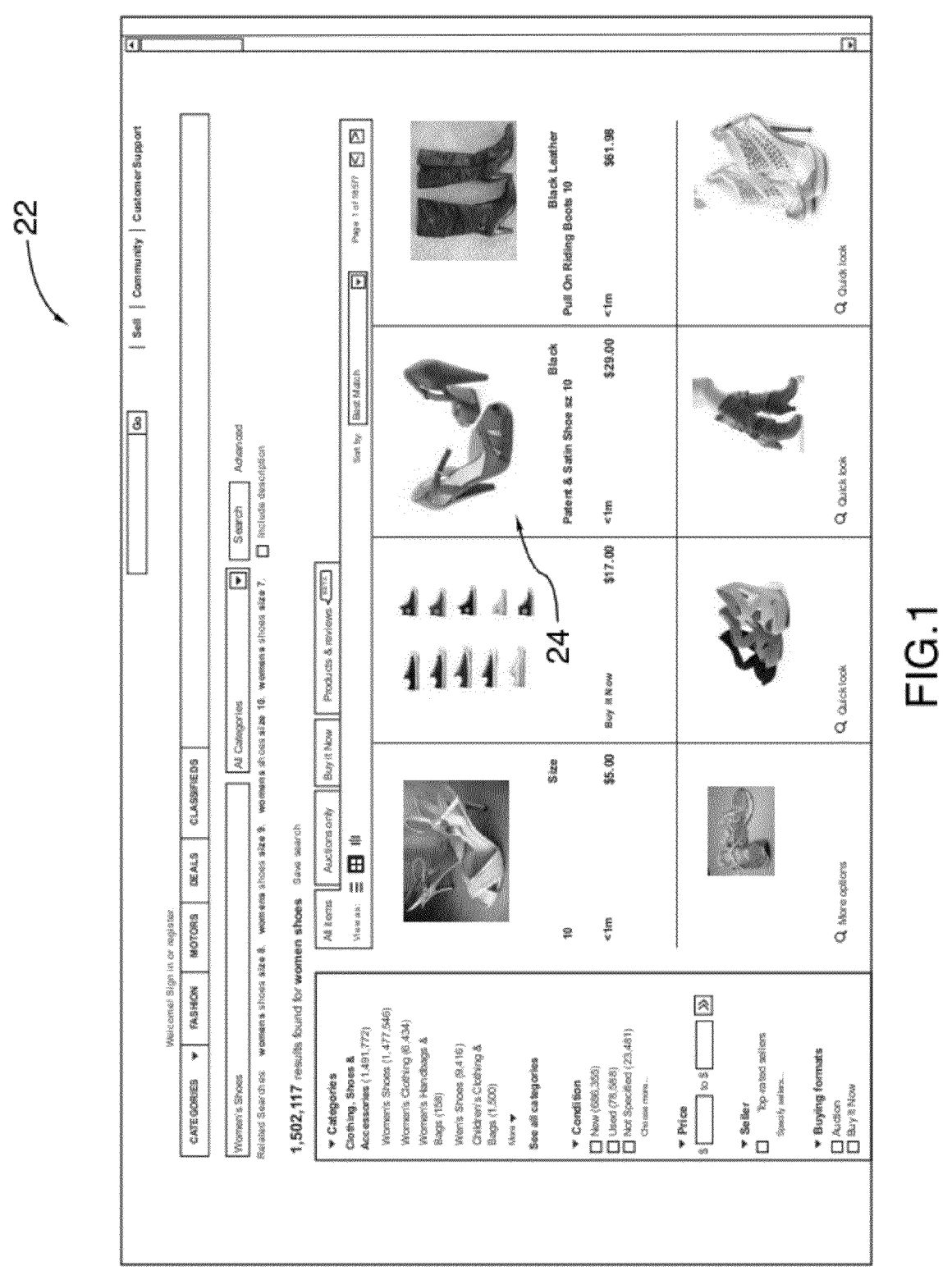

Turning now to the above-mentioned selection facility, in broad terms, this should be understood to be a facility for determining an image that is of interest to the user based on said interaction between said user and said system. In the context of the exemplary embodiment, the selection facility determines the image of interest based on the computer-implemented selection by the user of a vendible product in the catalogue of the portal, i.e. placing the cursor over the image and signifying a selection through the depression of the primary mouse button [a 'left-mouse-click' in the context of a conventional two-button mouse in a right-handed configuration]. A screen shot of an exemplary portal is illustrated in FIG. 1 and identified by reference numeral 22; the image entitled BLACK PATENT & SATIN SHOE SIZE 10 can be selected by placement of the cursor over the box indicated by 24, coupled with a left-mouse click.

The aforementioned left-mouse-click causes the display facility to display an enlarged view of the selected item, as indicated by 26 on the screen shot identified as 28 in FIG. 2, and to cause the comparison facility to carry out two similarity analyses between the image determined to be of interest [in the case of FIGS. 1 and 2, the image of the pair of black patent and satin shoes] and the images of the other plurality of vendible products in the catalogue of the portal.

The first similarity analysis compares, for overall similarity, the image determined to be of interest against the images of the other vendible products in the catalogue of the portal and causes the display facility to produce thumbnail images of the three images 30, 32, 34 calculated to be most similar overall [on the basis of shape, color and texture] to the image of interest, along with the caption "If the selected image wasn't quite right, you might find what you are looking for in the images below" 36.

The second similarity analysis compares, for similarity based on color and texture alone, the image determined to be of interest against the images of the other vendible products in the catalogue of the portal and causes the display facility to produce thumbnail images of the two images 38, 40 calculated to be most similar, along with the caption "These products might be nice as accessories" 42.

In terms of the specifics of the similarity comparison, in the exemplary embodiment, the formula to estimate the similarity is:

$$\text{Similarity} = \sum_i f\left(\omega_i^{location} S_i^{location}, \omega_i^{feature} \varphi^{feature}(D_i^{feature})\right) \quad \text{Formula 1}$$

From this generic formula, it will be seen that similarity in the exemplary embodiment is a function of feature [shape, texture, color] and location.

The function $f$ defines the way the location and the feature information are combined. In the exemplary embodiment, this is simple addition, but more complex functions are possible.

The influence of the location can be user-defined or automatically defined; it also can be different for each region of interest and feature.

The $\omega$ functions are the weights applied with respect to each dimension, i.e. $\omega^{location}$ defines how much weight (importance) is given to the location in the overall calculation. For example, in the case where the location does not matter, $\omega^{location}$ is set to the identity.

The $\omega$ feature defines the normalization function applied to the feature distance to put all features in the same scale. A useful normalization function normalizes each feature distribution to a normal distribution with a zero mean and a standard deviation of 1.0. For optimization purposes, and to avoid renormalization each time a new object is added to the collection, one can use a representative subset of the collection and track the discrepancy between the global statistics (i.e. using all the elements) and the partial statistics (i.e. using a representative subset) and update the statistics only if the discrepancy between the two is too high.

The feature distances $D_i$ are the actual distances between two objects in the respective feature space.

In the exemplary embodiment, the measurement of color similarity involves the steps of, for each of the image of interest and the images of the subset:

creating a three-dimensional histogram, with each dimension of the histogram being associated with one of the colors red, green and blue and the histogram being populated with values correlated with the R-G-B color combinations associated with discrete elements of said each image; and intersecting the histograms.

In the exemplary embodiment, the pixels of the image define the discrete elements of the image used for the purpose of the histogram and the histogram is based on Gaussian-corrected, quantized R-G-B values. Quantization is normally advantageous, as a 3-dimensional histogram on the 256 color scale is fairly large and space-demanding. At the same time, excessive quantization is not preferred, as it is preferable that the eventual histogram be well formed, i.e. well-populated. In the case of, for example, a 300×300 pixel image, quantization of the 256-level color scale to an 8- or 16-level scale has been useful. The use of a Gaussian histogram helps to compensate for the errors introduced by quantization. Persons of ordinary skill understand histogram creation and Gaussian correction and accordingly further detail is neither required nor provided.

The formula for color comparison can be represented as:

$$D_{a \leftrightarrow a'} = 1 - \sum_{i \in RGB_{quant}} \min\{h_i, h'_i\} \quad \text{Formula 2}$$

wherein D is the feature distance between image a and image a', h is the histogram for image a and h' is the histogram for image a'; color similarity is thus expressed in the range from 0 (identical) to 1.

Figure 3A:
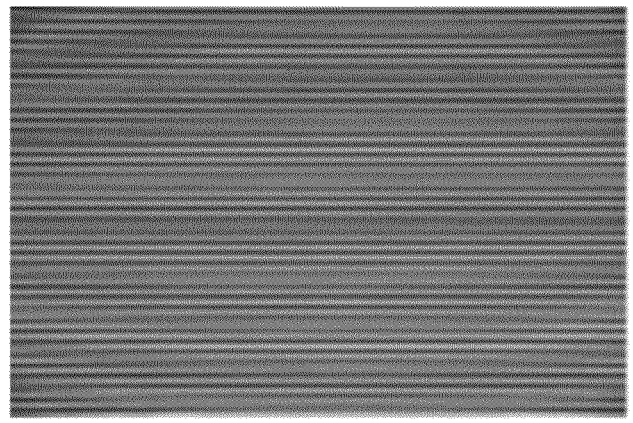
FIG. 3A is an image of a first wood-like texture.
Figure 3B:
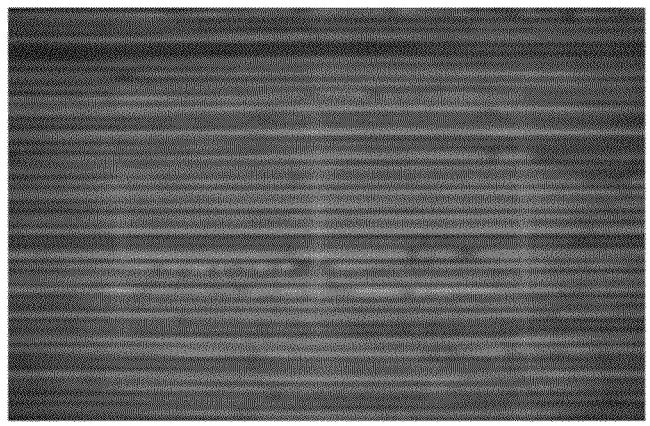
FIG. 3B is an image of a second wood-like texture.
Figure 3C:
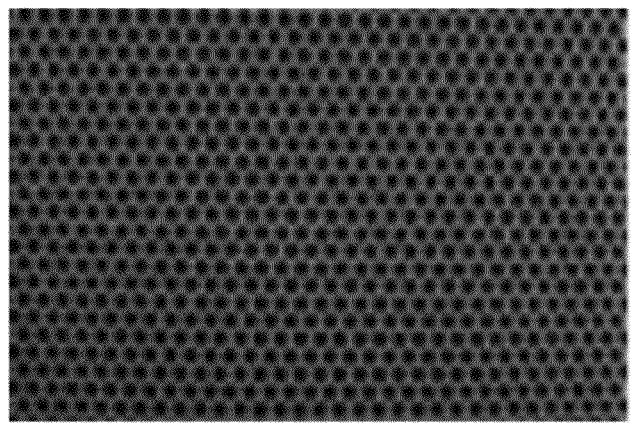
FIG. 3C is an image of a honeycomb structure.
Figure 4A:
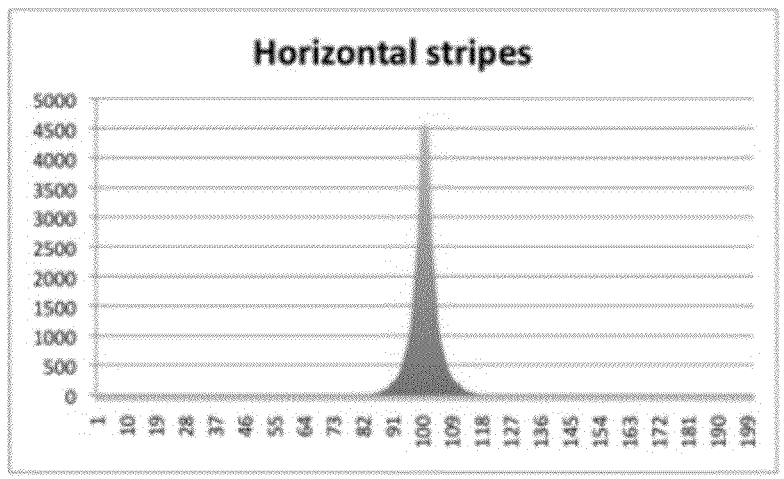
FIG. 4A is a histogram showing the results of a DCT filter applied to a plurality of locations on FIG. 3A.
Figure 4B:
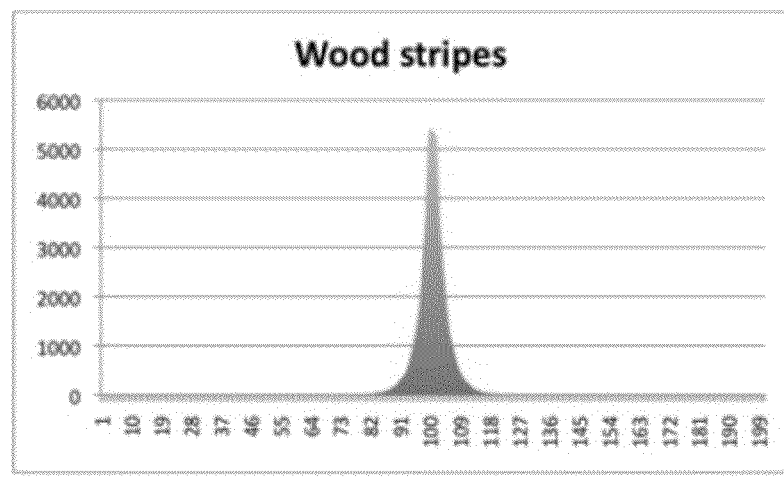
FIG. 4B is a histogram showing the results of a DCT filter applied to a plurality of locations on FIG. 3B.
Figure 4C:
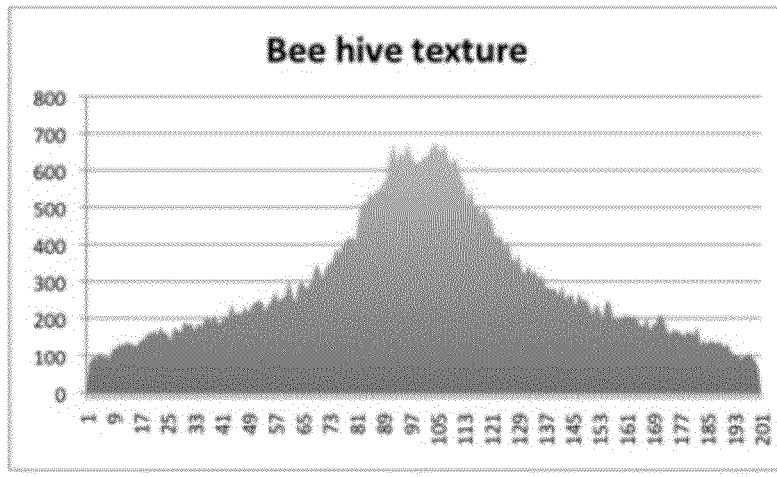
FIG. 4C is a histogram showing the results of a DCT filter applied to a plurality of locations on FIG. 3C.

On the matter of similarity in the texture space between images, the invention involves a general appreciation that a plurality of filters could be used to probe the image textures for response strength and, on the whole, images which are more similar in texture should respond more similarly to the filters. Thus, by quantifying the response strength [the effect of the filter], one can quantify the texture similarity. One way to do this quantification is by intersecting histograms of the response strength observed as the filters are applied to the images. By way of example, three different textures are shown in FIGS. 3A, 3B, 3C, with the leftmost pair 3A, 3B being fairly similar to one another and the rightmost texture 3C being dissimilar to the others. Application of a DCT filter and tabulation of the results generates the histograms shown in FIGS. 4A, 4B, 4C; the left and middle textures 3A,3B, which are fairly similar, result in very similar histograms 4A,4B, respectively; the different texture 3C gives a totally different histogram 4C. Intersection of these histograms will result in a value that is a function of the difference between the textures. This, of course, in respect of any single filter, may not be particularly representative of the texture similarity, but repetition of this with a number of different filters will normalize out noise and result in a value that has, in the whole, good correlation to texture difference/similarity.

The formula for texture comparison can thus be represented as:

$$D_{a \leftrightarrow a'} = \sum_{j \in F_{DCT}} \left(1 - \sum_i \min\{h_i^j, h_i'^j\}\right) \quad \text{Formula 3}$$

wherein D is the feature distance between image a and image a', h is the histogram for image a and h' is the histogram for image a'; in the context of a 16 filter comparison, texture similarity is thus expressed in the range from −16 (identical) to 0.

In the exemplary embodiment:

a plurality of virtual filters, specifically, 3-dimensional DCT base filters are provided, each representative of a different wavelength and being representable by a numeric array in the conventional manner for each of the image of interest and the images of the subset, each filter is applied to a plurality of locations on said each image to generate an aggregate intensity associated with each filter [the aggregate intensity being the product of the array with the brightness of the pixel(s) "beneath" the respective element of the array]

for each of the image of interest and the images of the subset, a histogram is created, one for each filter, the histogram being populated using the aggregate intensities that resulted from the application of said each filter to said each image and thereafter normalized to 1.0 for each filter, the histogram associated with the image of interest is intersected with each of the histograms associated with the images of the subset, to produce values for each image of the subset, the values generated by the intersection are aggregated, to produce the distance between the image of the subset and the image under comparison.

Turning now to the question of shape similarity, this measurement involves, as a first step, the application of an edge detection tool to the image of interest and said each image under comparison to identify points coincident with high contrast [i.e. visible] contours. This step thus notionally reduces each image into a line drawing, with each line being defined by a plurality of points.

The measurement of shape similarity, as between the image of interest and each image under comparison, thereafter involves an aggregation of values associated with each of at least a subset of the identified points of the image of interest, the values each being a function of the distance between the corresponding location of said each point on the image under comparison and the closest point coincident with a visible contour on the image under comparison;

the difference between the gradient of the contour at said each point and the gradient of the contour at said closest point; and the difference between the curvature of the contour at said each point and the curvature of the contour at said closest point.

The formula used to estimate the distance between two objects a and b can be represented as:

$$D_{a \leftrightarrow b} = \rho \times \left( \sum_{i \in C^a} \frac{Dist_i^b}{1 + \omega |\cos(\alpha_i)| \times f(\kappa_a, \kappa_b)} + \sum_{i \in C^b} \frac{Dist_i^a}{1 + \omega |\cos(\alpha_i)| \times f(\kappa_a, \kappa_b)} \right)$$

Figure 5:
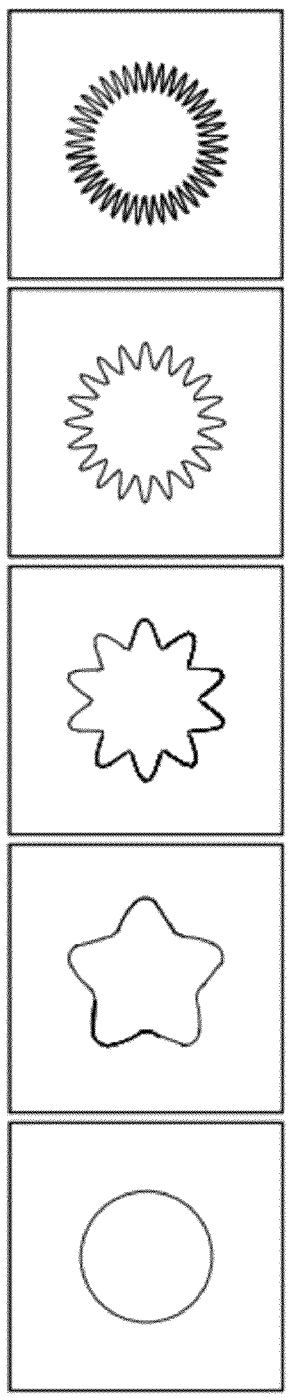
FIG. 5 is a collection of images, namely, circular waveforms.

Formula 4 where:
$C^a$ is the contour of the object a
$Dist_i^b$ is the distance between the point i of $C^a$ and $C^b$.
$a_i$ is the angle between the direction of the two contours in i and the closet point of $C^b$.
$\omega$ is the weight given to the contour similarity.
$\kappa^a$ is the curvature of $C^a$
$f$ is a central bell function with $f(0)=1$ and $f(\pm\infty)=0$
$\rho$ is the ratio between the shortest contour by the longest one By way of illustration, the shape distance comparison is shown in conjunction with live shapes, as shown in FIG. 5. As these are already line drawings, the edge detection tool would have nil effect, i.e. the images produced by the edge detection tool would be no different from those to which the tool was applied.

Figure 6:
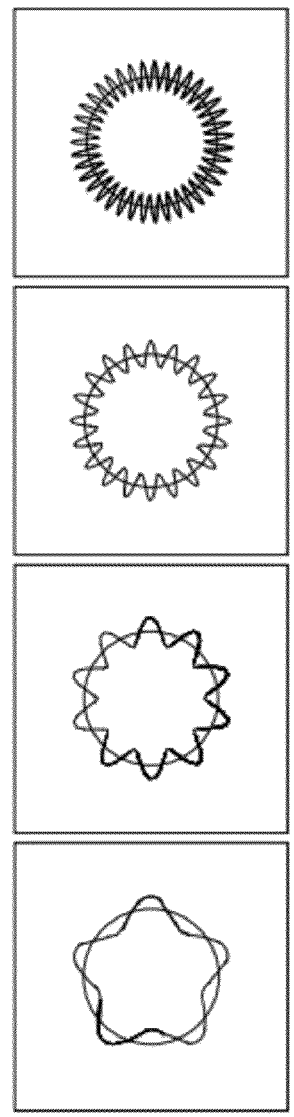
FIG. 6 is an image showing the leftmost image of FIG. 5 overlaid upon each of the remaining images of FIG. 5.

The next step is to generate the distance between the shape of interest, for example, the circle, with the remaining shapes. This is represented by overlaying the circle on each of the other images, as shown in FIG. 6

The application of Formula 4 to the overlapped shapes of FIG. 6 results [in circumstances wherein the radius of the base circle is 100 pixels in a 400×400 pixel image and the wave amplitude is 20 pixels] in the numerics shown in Table 1 below. From this it will be seen that the correcting factor provided by the gradient/curvature aspects of the formula has a tendency to punish shapes that are rough and favor shapes that are smooth.

TABLE 1

|  |  |  |  |  |
|---|---|---|---|---|
| Euclidian Distance | 27.1924 | 30.2091 | 38.9704 | 60.66 |
| Enhanced Distance | 7.22517 | 10.1851 | 17.5633 | 31.8429 |
| Euclidian Distance Discrimination power (ratio with shortest wave) | 1 | 1.11 | 1.43 | 2.23 |
| Enhanced Distance Discrimination power (ratio with shortest wave) | 1 | 1.41 | 2.43 | 4.40 |

TABLE 2 shows the results of an exemplary embodiment of the invention applied to five shoes.

| Shape distance Texture distance Color distance | | | | | |
|---|---|---|---|---|---|
|  | 0 | 19.7994 | 21.3254 | 22.074 | 13.6482 |
|  | −16 | −7.0452 | −6.02239 | −6.47819 | −5.9234 |
|  | 0 | 0.680903 | 0.0482808 | 0.177704 | 0.564732 |
|  | 19.7994 | 0 | 5.91056 | 11.1569 | 13.2662 |
|  | −7.0452 | −16 | −6.89093 | −7.56366 | −6.81172 |
|  | 0.680903 | 0 | 0.678631 | 0.574567 | 0.725485 |
|  | 21.3254 | 5.91056 | 0 | 17.5018 | 18.3602 |
|  | −6.02239 | −6.89093 | −16 | −8.04382 | −8.63784 |
|  | 0.0482808 | 0.678631 | 0 | 0.192224 | 0.59426 |
|  | 22.074 | 11.1569 | 17.5018 | 0 | 8.00532 |
|  | −6.47819 | −7.56366 | −8.04382 | −16 | −7.93935 |
|  | 0.177704 | 0.574567 | 0.192224 | 0 | 0.519711 |
|  | 13.6482 | 13.2662 | 18.3602 | 8.00532 | 0 |
|  | −5.9234 | −6.81172 | −8.63784 | −7.93935 | −16 |
|  | 0.564732 | 0.725485 | 0.59426 | 0.519711 | 0 |

From a review of Table 2, it will be evident that the invention provides a useful tool for ranking image similarity.

In terms of application, it is conceivable that all of the steps associated with histogram creation and intersection, in respect of color, shape and texture, could be carried out on-demand, i.e. only when a selection has been made and the comparison facility is to be engaged. However, in order to ensure reasonable response speed, this would require significant processing power. At the other end of the spectrum, it is conceivable that all of the steps associated with histogram creation and intersection could be carried out in advance, for each of the stored images against each of the remaining stored images, with the results stored for subsequent retrieval on demand. However, this would require significant storage capacity. An advantageous embodiment, which allows for reasonable response speed without undue storage needs, is to carry out the histogram creation steps for each image in advance, storing the results, and carrying out the intersection on-demand when an image has been selected.

Whereas in the exemplary embodiment, the selection facility determines the image of interest based on the selection by the user of an image made visible by the display facility, it will be appreciated that this is not necessary and that that the invention has usefulness in other applications. For example, the system could be used in combination with a series of images that have been indexed for text-based searching, to search a larger series of non-indexed images: entry of a text-based search query could point the selection tool to a particular image, and this image could be deemed the image of interest for the purpose of a comparison analysis against the balance of images in the collection. As yet another option, the selection facility could determine the image of interest on the basis of a ranking calculation of images rendered viewable to the user by the display facility based on one or more of: the duration of image visibility; incidence of image visibility; and historical viewing patterns. Thus, for example, in the context of a user who in the course of a relatively short duration of time spends a long time visiting a site where a particular image is viewable, that particular image might be deemed to be an image of interest, notwithstanding that the user makes no positive steps to select it. This might have application in the field of, for example, banner or pop-up advertising.

As well, whereas in the exemplary embodiment, the comparison analysis is suggested to be fixedly based on an entire image, it will be understood that the user could be allowed to select a portion of any image visible on the screen with that portion defining the image of interest. Any conventional mechanism can be used for portion selection, such as the commonplace methodology whereby the cursor is dragged across the screen while the left-mouse-click button is engaged to draw a box around the desired portion of the image.

Alternatively, the image of interest could be selected in its entirety according to any of the methods described above, or others, but the similarity comparison could be weighted more heavily in the selected area.

Similarly, whereas in the exemplary embodiment, the comparison analysis is suggested to be based on somewhat fixed parameters in terms of the weightings giving to color, texture and, optionally, shape, it will be appreciated that a tuning facility could be provided, to permit the user to vary the relative weight given to at least one of the measurements in the calculation for the purpose of ranking. This could apply to the entirety of the image of interest, or to any selected portion of the image.

Further, a tuning facility, in the form of a virtual slider, could be provided to permit the user to balance texture similarity against color similarity.

Further, it is noted that, in FIG. 5, each of the images is similarly-sized and centered in the frame. In the context of for example, an online shopping portal maintained by a retailer, presentation of images in this fashion can be a requirement for inclusion in the portal. However, there may be situations wherein the stored images are varied in terms of size and position. In cases such as these, it will be advantageous to normalize the notional 'line drawings' to permit better analysis.

One such normalization technique would be to allocate to each of the points coincident with high contrast a notional weight, calculate the 'centre of gravity' of each image, and offset each image to a common origin prior to carrying out the notional overlap step indicated by the sequence of FIGS. 5,6.

Another such normalization technique would be to, after the aforementioned offset had taken place, calculate the average distance between each of the points and the common origin; divide the average distance for the image of interest by the average distance of the image under comparison; and enlarge the image by a factor equal to the quotient.

As well, whereas the described embodiment contemplates the system as being used with a plurality of stored images, it will be understood that the invention can be embodied with images stored, for example, on the same server that provides the functionality of an online shopping portal and the invention can also be embodied in arrangements wherein the images are stored externally of the server that provides, for example, the selection and comparison facility. The system could, thus, permit a user to carry out comparisons of images found throughout the Internet.

Yet other variations are possible. Accordingly, the invention should be understood as limited only by the accompanying claims, purposively construed.

What is claimed is:

1. A system for use by a user and with a plurality of stored images, the system comprising:
    a retrieval facility for accessing said plurality of stored images;
    a display facility for displaying images from said plurality to said user;
    a response facility for permitting interaction between the user and the system;
    a selection facility for determining an image that is of interest to said user based on said interaction between said user and said system; and
    a comparison facility for carrying out a similarity analysis between the image determined to be of interest and each of at least a subset of said plurality of stored images, the similarity analysis involving a calculation based on one or more of a measurement of color similarity, texture similarity and shape similarity.

2. A system according to claim 1, wherein the retrieval, display and response facility are defined by a web browser.

3. A system according to claim 2, wherein the selection facility determines the image of interest based any one of:
    the selection by the user of an image made visible by the display facility;
    the result of a user-originated text search of a portion of the stored images that have been indexed for text searching; and
    a ranking calculation of images rendered viewable to the user by the display facility based on one or more of: the duration of image visibility; incidence of image visibility; and
    historical viewing patterns.

4. A system according to claim 3, wherein the selection facility and comparison facility are associated with a website the comparison facility carries out a similarity analysis between the image determined to be of interest and images associated with advertisements to select an advertisement;

the website actuates the display facility to make the selected advertisement visible to the user.

5. A system according to claim 1, wherein the similarity analysis involves a calculation based on at least a measurement of color similarity, the measurement of color similarity involving the steps of:

for each of the image of interest and the images of the subset, creating a three-dimensional histogram, with each dimension of the histogram being associated with one of the colors red, green and blue and the histogram being populated with values correlated with the R-G-B color combinations associated with discrete elements of said each image; and intersecting the histograms.

6. A system according to claim 5, wherein the pixels of the image define the discrete elements of the image used for the purpose of the histogram and the histogram is based on Gaussian-corrected, quantized R-G-B values.

7. A system according to claim 1, wherein the similarity analysis involves a calculation based on at least a measurement of texture similarity, the measurement of texture similarity involving the steps of:

providing a plurality of virtual filters; and for each of the image of interest and the images of the subset, applying each filter to a plurality of locations on said each image to generate an aggregate intensity associated with each filter.

8. A system according to claim 7, wherein each filter is a numeric array, the arrays having common dimensions;

each location has an associated numeric array of dimensions equal to the common dimension, the numerics being associated with brightness; and the application of the filter to a location results in a value which, is the product of the numeric array of the filter with the numeric array associated with the location, the value defining the aggregate intensity.

9. A system according to claim 8, wherein for each of the image of interest and the images of the subset, histograms are created, one for each filter, the histogram being populated using the aggregate intensities that resulted from the application of said each filter to said each image; and for each filter, the histogram associated with the image of interest is intersected with each of the histograms associated with the images of the subset, to produce values; and for each image of the subset, the values generated by the intersection are aggregated.

10. A system according to claim 9, wherein the filters are DCT base filters and the histograms are normalized to integrate to the value 1.0 before intersection.

11. A system according to claim 1, wherein the similarity analysis involves a calculation based on at least a measurement of shape similarity, the measurement of shape similarity involving the application of an edge detection tool to the image of interest and said each image under comparison to identify points coincident with visible contours.

12. A system according to claim 11, wherein the measurement of shape similarity, as between the image of interest and each image under comparison, involves, an aggregation of values associated with each of at least a subset of the identified points of the image of interest, the values each being a function of the distance between the corresponding location of said each point on the image under comparison and the closest point coincident with a visible contour on the image under comparison.

13. A system according to claim 11, wherein the measurement of shape similarity, as between the image of interest and each image under comparison, involves, an aggregation of values associated with each of at least a subset of the identified points of the image of interest, the values each being a function of the distance between the corresponding location of said each point on the image under comparison and the closest point coincident with a visible contour on the image under comparison;

the difference between the gradient of the contour at said each point and the gradient of the contour at said closest point; and the difference between the curvature of the contour at said each point and the curvature of the contour at said closest point.

14. A system for use by a user, the system comprising:

a plurality of stored images;

a retrieval facility for accessing the plurality of stored images;

a display facility for displaying images from the plurality to said user;

a response facility for permitting interaction between the user and the system;

a selection facility for determining an image that is of interest to said user based on said interaction between said user and said system; and a comparison facility for carrying out a similarity analysis between the image determined to be of interest and each of at least a subset of said plurality of stored images, the similarity analysis involving a calculation based on one or more of a measurement of color similarity, texture similarity and shape similarity.

15. A system according to claim 14, wherein the plurality of images are associated with an online shopping portal.

16. A system according to claim 15, wherein the selection facility determines the image of interest in response to the selection by the user of a vendible product in the catalogue of the portal; or the selection by the user of a portion of an image rendered visible to the user by the display facility.

17. A system according to claim 16, wherein the display facility, in response to a determination of an image of interest, carries out the similarity analysis between the image of interest and images associated with vendible products in the catalogue of the portal; and the online shopping portal makes visible to the user at least the image calculated to be most similar to the image of interest.

18. A system according to claim 17, wherein the calculation is based on at least two measurements selected from measurement of color similarity, measure of texture similarity and measurement of shape similarity.

19. A system according to claim 18, further comprising a tuning facility adapted to permit the user to vary the relative weight given to at least one of the measurements in the calculation for the purpose of ranking.

20. A system according to claim 19, wherein the tuning facility is adapted to permit the user to balance texture similarity against color similarity.

21. A system according to claim 19, wherein the tuning facility is adapted to permit the user to vary the relative weight given to at least one of the measurements in the calculation for the purpose of ranking.

* * * * *